United States Patent
Schmidt et al.

(10) Patent No.: US 11,572,251 B2
(45) Date of Patent: Feb. 7, 2023

(54) ELEVATOR DOOR SENSOR FUSION, FAULT DETECTION, AND SERVICE NOTIFICATION

(71) Applicant: Otis Elevator Company, Farmington, CT (US)

(72) Inventors: Walter Thomas Schmidt, Marlborough, CT (US); Abdelilah Sakti, East Granby, CT (US); Michael J. Tracey, Cromwell, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 1196 days.

(21) Appl. No.: 16/105,762

(22) Filed: Aug. 20, 2018

(65) Prior Publication Data

US 2020/0055697 A1    Feb. 20, 2020

(51) Int. Cl.
| | | |
|---|---|---|
| *B66B 5/00* | (2006.01) | |
| *B66B 1/28* | (2006.01) | |
| *B66B 1/34* | (2006.01) | |
| *B66B 5/02* | (2006.01) | |

(Continued)

(52) U.S. Cl.
CPC .............. *B66B 5/0031* (2013.01); *B66B 1/28* (2013.01); *B66B 1/3407* (2013.01); *B66B 1/3446* (2013.01); *B66B 5/02* (2013.01); *B66B 13/24* (2013.01); *G01V 11/00* (2013.01)

(58) Field of Classification Search
CPC ....... B66B 5/0031; B66B 1/28; B66B 1/3407; B66B 1/3446; B66B 5/02; B66B 13/24; B66B 5/0025; B66B 5/00; G01V 11/00
See application file for complete search history.

(56) References Cited

U.S. PATENT DOCUMENTS

| | | |
|---|---|---|
| 7,044,271 B2 | 5/2006 | De Coi |
| 9,120,646 B2 | 9/2015 | Loeb et al. |
| 9,212,028 B2 | 12/2015 | Novak |

(Continued)

FOREIGN PATENT DOCUMENTS

| | | |
|---|---|---|
| CN | 102408047 A | 4/2012 |
| CN | 106796747 A | 5/2017 |

(Continued)

OTHER PUBLICATIONS

Extened Eurpoean Search Report for Application No. 19192714.4-1017; dated Jan. 31, 2020; 8 pages.

(Continued)

*Primary Examiner* — Jeffrey Donels
(74) *Attorney, Agent, or Firm* — Cantor Colburn LLP (57) ABSTRACT

A system for elevator door sensor fusion, fault detection, and service notification is provided. The system includes a processor and a memory including computer-executable instructions that, when executed by the processor, cause the processor to perform operations. The operations include monitoring outputs of a plurality of sensors. It is determined whether the outputs of the plurality of sensors follow an expected pattern. Based at least in part on determining that the outputs of the plurality of sensors do not follow the expected pattern: identifying a sensor in the plurality of sensors that is not following the expected pattern, and transmitting a notification indicating that the sensor is exhibiting unexpected behaviour.

18 Claims, 4 Drawing Sheets

(51) Int. Cl.
　　*B66B 13/24*　　(2006.01)
　　*G01V 11/00*　　(2006.01)

(56) References Cited

U.S. PATENT DOCUMENTS

| | | | |
|---|---|---|---|
| 9,341,013 | B2 | 5/2016 | Iwata et al. |
| 9,751,727 | B1 | 9/2017 | Novak |
| 9,797,184 | B2 | 10/2017 | Collins et al. |
| 2015/0014098 | A1* | 1/2015 | Stolzl .................. B66B 1/30 187/394 |
| 2015/0360912 | A1 | 12/2015 | Kattainen et al. |
| 2020/0071133 | A1* | 3/2020 | Kelly .................... G01V 8/10 |

FOREIGN PATENT DOCUMENTS

| | | | |
|---|---|---|---|
| EP | 1050503 | A1 | 11/2000 |
| GB | 2526070 | A | 11/2015 |
| GB | 2526071 | B | 5/2018 |
| GN | 107601199 | A | 1/2018 |
| JP | 2006111393 | A | 4/2006 |
| JP | 2010275043 | A | 12/2010 |
| JP | 2010285258 | A | 12/2010 |
| JP | 5380407 | B2 | 1/2014 |
| JP | 5660614 | B2 | 1/2015 |
| KR | 20180043926 | A | 5/2018 |
| WO | 2016135114 | A1 | 9/2016 |

OTHER PUBLICATIONS

Chinese OA Issued Sep. 7, 2020 for CN Application No. 201910763678. 8, 6 pages.
Koketsu et al., "Safety of Doors for "Axiez" Mitsubishi Standard Elevators", Technical Reports, Inazawa Works, Aug. 30, 2006, 3 pages.

* cited by examiner

ELEVATOR DOOR SENSOR FUSION, FAULT DETECTION, AND SERVICE NOTIFICATION

BACKGROUND

The subject matter disclosed herein relates to the field of elevator sensors to detect passenger presence, and more particularly relates to elevator door sensor fusion, fault detection, and service notification.

Many elevator safety events are related to passenger interactions with the door and door strikes. Sensing in the door plane is currently required by code (as specified for example in American Society of Mechanical Engineers A17.1) and is typically achieved through the use of a light curtain sensor. If a fault is detected within the light curtain sensor, the elevator is placed into a nudging mode until the light curtain sensor is repaired. To counteract the possibility of door strikes new elevator systems may use multiple sensors. The multiple sensors are typically used in tandem to sense passengers as they approach the door and to initiate a door reversal before the elevator threshold is breached.

BRIEF SUMMARY

According to an embodiment, a system configured to perform elevator door sensor fusion, fault detection, and service notification is provided. The system includes a processor and a memory including computer-executable instructions that, when executed by the processor, cause the processor to perform operations. The operations include monitoring outputs of a plurality of sensors. It is determined whether the outputs of the plurality of sensors follow an expected pattern. Based at least in part on determining that the outputs of the plurality of sensors do not follow the expected pattern: identifying a sensor in the plurality of sensors that is not following the expected pattern and transmitting a notification indicating that the sensor is exhibiting unexpected behaviour.

In addition to one or more of the features described herein, or as an alternative, further embodiments of the system may include that the expected pattern includes a maximum elapsed time between an output from the sensor and an output from a second sensor in the plurality of sensors.

In addition to one or more of the features described herein, or as an alternative, further embodiments of the system may include that the expected pattern includes a minimum frequency of an output from the sensor.

In addition to one or more of the features described herein, or as an alternative, further embodiments of the system may include that the expected pattern includes an output from a second sensor occurring after an output from the sensor.

In addition to one or more of the features described herein, or as an alternative, further embodiments of the system may include that the plurality of sensors detect an object proximate to an elevator door of an elevator.

In addition to one or more of the features described herein, or as an alternative, further embodiments of the system may include that the operations further include moving the elevator into a nudging mode based at least in part on determining that the outputs of the plurality of sensors do not follow the expected pattern.

In addition to one or more of the features described herein, or as an alternative, further embodiments of the system may include that the operations further include removing the elevator from service based at least in part on determining that the outputs of the plurality of sensors do not follow the expected pattern.

In addition to one or more of the features described herein, or as an alternative, further embodiments of the system may include that the sensor is a volumetric sensor.

In addition to one or more of the features described herein, or as an alternative, further embodiments of the system may include that the sensor is a light curtain sensor.

In addition to one or more of the features described herein, or as an alternative, further embodiments of the system may include that the operations further include replacing the sensor based at least in part on determining that the outputs of the plurality of sensors do not follow the expected pattern.

In addition to one or more of the features described herein, or as an alternative, further embodiments of the system may include that the operations further include updating the expected pattern based at least in part on user input.

In addition to one or more of the features described herein, or as an alternative, further embodiments of the system may include that the operations further include updating the expected pattern based at least in part on the outputs of the plurality of sensors and user input.

According to an embodiment, a method of performing elevator door sensor fusion, fault detection, and service notification is provided. The method includes monitoring outputs of a plurality of sensors. It is determined whether the outputs of the plurality of sensors follow an expected pattern. Based at least in part on determining that the outputs of the plurality of sensors do not follow the expected pattern: identifying a sensor in the plurality of sensors that is not following the expected pattern and transmitting a notification indicating that the sensor is exhibiting unexpected behaviour.

In addition to one or more of the features described herein, or as an alternative, further embodiments of the method may include that the expected pattern includes a maximum elapsed time between an output from the sensor and an output from a second sensor in the plurality of sensors.

In addition to one or more of the features described herein, or as an alternative, further embodiments of the method may include that the expected pattern includes a minimum frequency of an output from the sensor.

In addition to one or more of the features described herein, or as an alternative, further embodiments of the method may include that the expected pattern includes an output from a second sensor occurring after an output from the sensor.

In addition to one or more of the features described herein, or as an alternative, further embodiments of the method may include that the plurality of sensors detect an object proximate to an elevator door of an elevator, and the method further includes moving the elevator into a nudging mode based at least in part on determining that the outputs of the plurality of sensors do not follow the expected pattern.

In addition to one or more of the features described herein, or as an alternative, further embodiments of the method may include that the plurality of sensors detect an object proximate to an elevator door of an elevator, and the method further includes removing the elevator from service based at least in part on determining that the outputs of the plurality of sensors do not follow the expected pattern.

In addition to one or more of the features described herein, or as an alternative, further embodiments of the method may include that the operations further include updating the expected pattern based at least in part on user input.

In addition to one or more of the features described herein, or as an alternative, further embodiments of the method may include that the operations further include updating the expected pattern based at least in part on the outputs of the plurality of sensors and user input.

Technical effects of embodiments of the present disclosure include improved identification of sensor faults through the user of sensor fusion and fault detection. Technical effects may also include an enhanced passenger experience and better customer satisfaction through fast relay to an elevator service provider of a fault state. Technical effects may further include ensuring robust sensor communication even when a sensor is in a fault state so that the elevator is not prematurely forced into nudging mode and operation continues in the safest state possible (e.g., nudging for a code sensor fault, normal operation for a non-code sensor fault) until a repair occurs.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The present disclosure is illustrated by way of example and not limited in the accompanying figures in which like reference numerals indicate similar elements.

DETAILED DESCRIPTION

One or more embodiments of the present disclosure utilize multiple sensors to detect passenger presence and to self-evaluate sensor health. If one or more sensors that typically follow a particular pattern no longer do so, this information may be used to identify a fault within a sensor and preventative actions can be taken to proactively ensure passenger safety. If a sensor related to code compliance is deemed to be in a fault state, the elevator may be shut down or forced into nudging mode and an elevator service provider can be contacted to ensure immediate resolution of the matter. In the case where a secondary sensor experiences a fault, the elevator may continue operation in a normal manner (e.g., not forced into nudging mode), the sensor of interest may be temporarily disabled, and a notification may be send to an elevator services provider for resolution at an earliest convenience.

In one or more embodiments of the present invention, sensor health is self-evaluated by monitoring actual sensor outputs and comparing them to expected sensor output patterns. If the actual output from a sensor is contradicting the expected behavior of the sensor, then sensor fusion will identify the unexpected behavior and determine a course of action to maximize passenger safety. For code dependent sensors (those needed for code compliance) having unexpected behavior, the elevator may be forced into nudging mode and a high priority notification sent to an elevator service provider for repair. For non-code dependent sensors (those not required for code compliance) exhibiting unexpected behavior, the elevator may continue to function normally and a second level priority notification is sent to an elevator service provider.

As used herein, the term "sensor fusion" refers to the use of sensor output from multiple sensors that are combined into a single result. For example, sensor output from a light curtain sensor and a volumetric sensor may be combined to send a single instruction to a door controller of an elevator. In this example, the output from the light curtain sensor and the output from the volumetric sensor are fused to create a single instruction to control the operation of an elevator door. In another example, sensor output from a light curtain sensor and a volumetric sensor may be combined to determine whether the volumetric senor is exhibiting expected behavior. In this example, a sensor output from the light curtain sensor is expected to be generated within a threshold amount of time that an output from the volumetric sensor is generated, and the timing of the outputs are fused to determine whether the sensors are operating in an expected manner. In one or more embodiments, the outputs from the sensors include time stamps to indicate the exact time that the sensor creating the output was triggered.

As used herein, the term "nudging mode" refers to an elevator mode where the door slowly closes while a buzzer or tone sounds signaling passengers to stand clear of the door.

As used herein, the term "service provider" refers to any person or entity that is monitoring the status of a product, such as an elevator. Upon notification that an element of the product is exhibiting unexpected behavior (e.g., a sensor is not operating as expected), the service provider either repairs the product or notifies the correct party to repair the product.

Embodiments of the present invention are not limited to environments that include elevators. Embodiments may be implemented in any environment where sensors are used to indicate the presence of a person, and the sensors track an expected pattern of the person in the environment.

Figure 1:
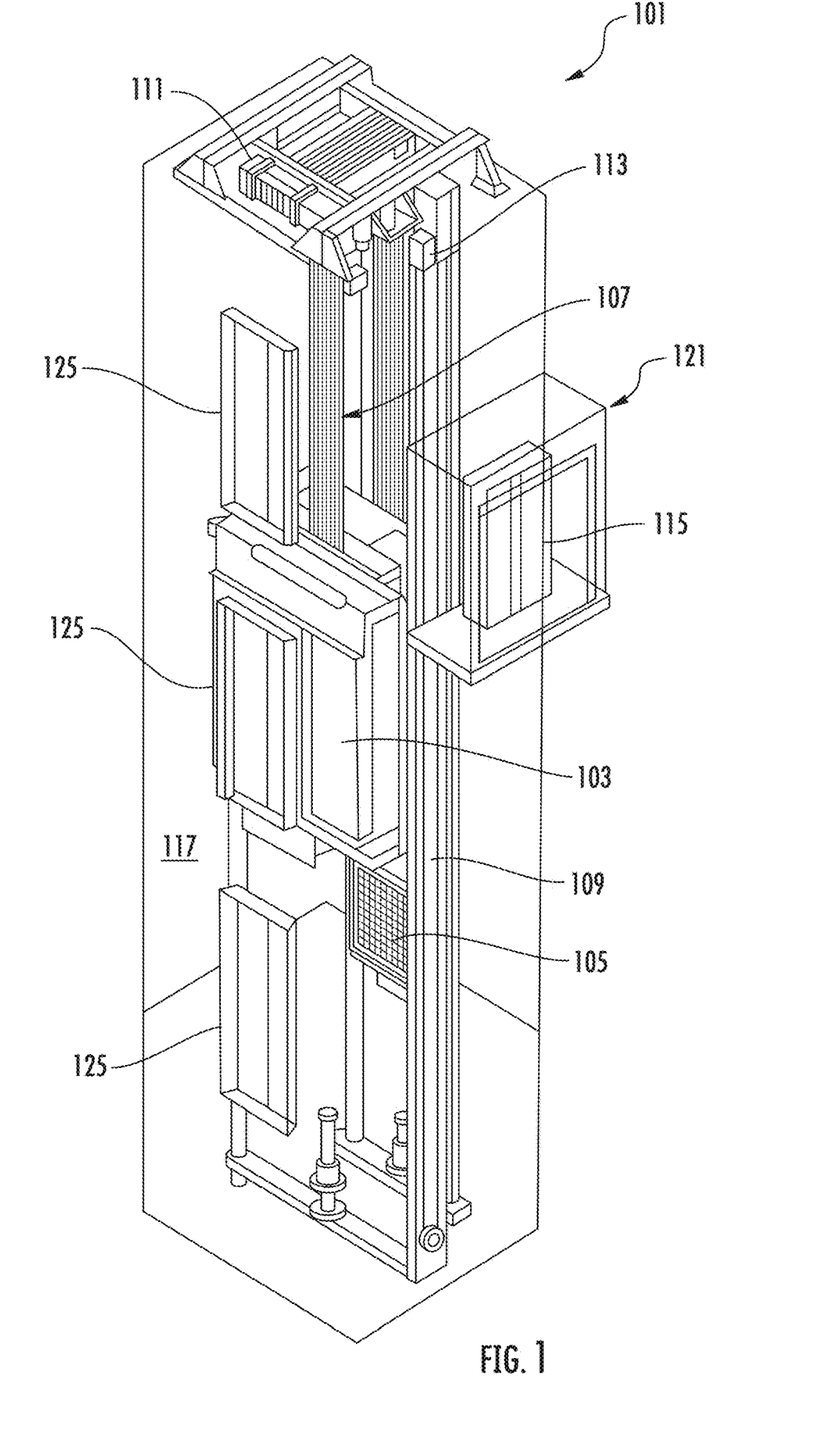
FIG. 1 is a schematic illustration of an elevator system that may employ various embodiments of the present disclosure.

FIG. 1 is a perspective view of an elevator system 101 including an elevator car 103, a counterweight 105, a tension member 107, a guide rail 109, a machine 111, a position reference system 113, and a controller 115. The elevator car 103 and counterweight 105 are connected to each other by the tension member 107. The tension member 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator shaft 117 and along the guide rail 109.

The tension member 107 engages the machine 111, which is part of an overhead structure of the elevator system 101. The machine 111 is configured to control movement between the elevator car 103 and the counterweight 105. The position reference system 113 may be mounted on a fixed part at the top of the elevator shaft 117, such as on a support or guide rail, and may be configured to provide position signals related to a position of the elevator car 103 within the elevator shaft 117. In other embodiments, the position reference system 113 may be directly mounted to a moving component of the machine 111, or may be located in other positions and/or configurations as known in the art. The position reference system 113 can be any device or mechanism for monitoring a position of an elevator car and/or counter weight, as known in the art. For example, without limitation, the position reference system 113 can be an encoder, sensor, or other system and can include velocity sensing, absolute position sensing, etc., as will be appreciated by those of skill in the art.

The controller 115 is located, as shown, in a controller room 121 of the elevator shaft 117 and is configured to control the operation of the elevator system 101, and particularly the elevator car 103. For example, the controller 115 may provide drive signals to the machine 111 to control the acceleration, deceleration, leveling, stopping, etc. of the elevator car 103. The controller 115 may also be configured to receive position signals from the position reference system 113 or any other desired position reference device. When moving up or down within the elevator shaft 117 along guide rail 109, the elevator car 103 may stop at one or more landings 125 as controlled by the controller 115. Although shown in a controller room 121, those of skill in the art will appreciate that the controller 115 can be located and/or configured in other locations or positions within the elevator system 101. In one embodiment, the controller may be located remotely or in the cloud.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor. The machine 111 may include a traction sheave that imparts force to tension member 107 to move the elevator car 103 within elevator shaft 117.

Although shown and described with a roping system including tension member 107, elevator systems that employ other methods and mechanisms of moving an elevator car within an elevator shaft may employ embodiments of the present disclosure. For example, embodiments may be employed in ropeless elevator systems using a linear motor to impart motion to an elevator car. Embodiments may also be employed in ropeless elevator systems using a hydraulic lift to impart motion to an elevator car. FIG. 1 is merely a non-limiting example presented for illustrative and explanatory purposes.

In other embodiments, the system comprises a conveyance system that moves passengers between floors and/or along a single floor. Such conveyance systems may include escalators, people movers, etc. Accordingly, embodiments described herein are not limited to elevator systems, such as that shown in FIG. 1.

Figure 2:
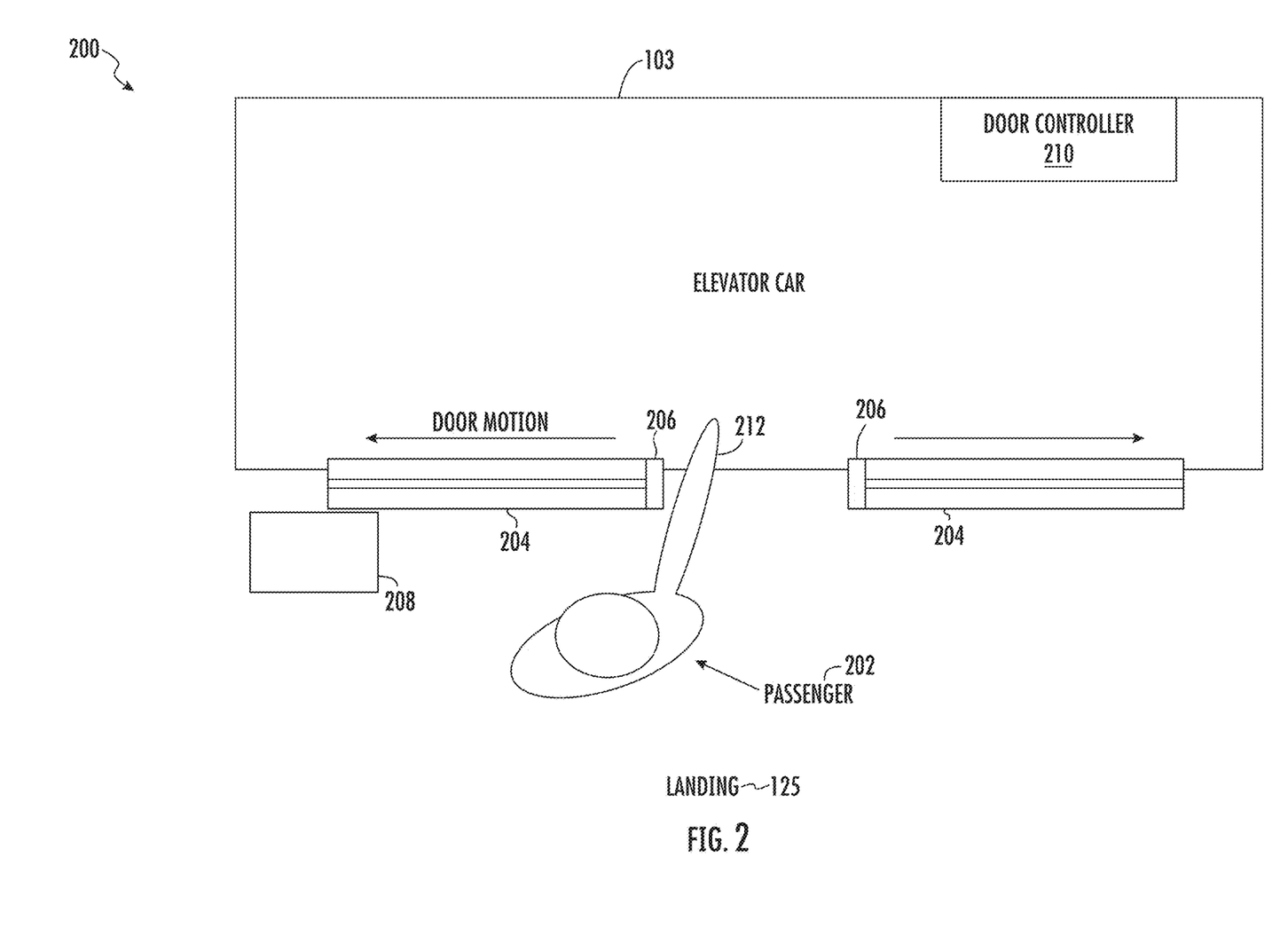
FIG. 2 is a simplified perspective of a passenger detected by multiple sensors near an elevator door in accordance with one or more embodiments of the present disclosure.

Turning now to FIG. 2, a simplified perspective 200 of a passenger detected by multiple sensors near, or proximate to, an elevator door is generally shown in accordance with one or more embodiments of the present disclosure. FIG. 2 depicts a two sensor door detection system that has a light curtain sensor 206 for sensing objects in the plane of the door and a volumetric sensor 208 for detecting approaching passengers 202 at a landing 125. In addition, FIG. 2 depicts a door controller 210 located, for example, on top of the elevator car 103 that can receive the output signals from the sensors and includes logic to perform at least a subset of the processing described herein. In one or more embodiments, the door controller 210 directs the operation of the passenger doors 204 that provide access to the elevator car 103. In an alternate embodiment, all or a subset of the door controller 210 is located in another location other than the top of the elevator car, such as in elevator controller 115

As shown in FIG. 2, a passenger 202 is standing outside the passenger doors 204 (e.g., 300 millimeters away) with one hand 212 in the door threshold. The hand 212 in the door threshold will be sensed by the light curtain sensor 206, which will instruct door controller 210 to open the doors 204. The passenger's presence in front of the doors 204 would be sensed by the volumetric sensor 208, which will also instruct the door controller 210 to open the doors. When an approaching passenger 202 holds a hand 212 in the door threshold as shown in FIG. 1, it is expected that both light curtain sensor 206 and volumetric sensor 208 will be triggered (e.g., they will generate outputs) at the same time, or close in time. The maximum expected amount of time between the sensors being triggered may be specified by a threshold amount of time such as one second or five seconds. If the light curtain sensor 206 is triggered with no accompanying trigger from the volumetric sensor 208 within the threshold amount of time, then that is an indication that the volumetric sensor 208 may not be operating properly and an action is taken. The action may include an alert to a service provider that the volumetric sensor 208 may be faulty and the action may also include requesting a change to an operating mode of the elevator, for example by sending a request to door controller 210. In one or more embodiments, the action is taken only after the expected pattern is not detected a specified number of times.

While it is possible to have situations where the volumetric sensor 208 and the light curtain sensor 206 are not triggered in similar time proximity (e.g., when a person reaches into the door plane from the elevator car 103 to hold the elevator for someone), they will typically both be triggered as people enter and exit the elevator car 103. If the light curtain sensor 206 is consistently triggered without the volumetric sensor 208 being triggered, or vice versa, the elevator can assume that the sensor is faulty and an action can be taken such as sending a notification to an elevator service provider.

One or more embodiments of the sensor fusion and fault detection can be used for any combination of sensors positioned to detect a person near an elevator door threshold such as, but not limited to: light curtain sensors, volumetric sensors, motion detector sensors, door edge detector sensors, door jamb detector sensors, and cameras. One or more embodiments can be implemented with more than two sensors and the sensors can be located either inside or outside (as shown in FIG. 2) of the elevator car 103. In one or more embodiments, more than one of each type of sensor may be monitoring passengers entering the elevator car 103 from the landing 125. In addition, more than one of each type of sensor may be monitoring passengers exiting the elevator car 103 to the landing 125. In either case (e.g., monitoring entry or exit) the sensor can be located within the elevator car 103 and/or outside of the elevator car 103. Additional sensors can be located in a hallway near the landing 125 and/or on a route expected to be taken by a person heading to the landing 125.

Figure 3:
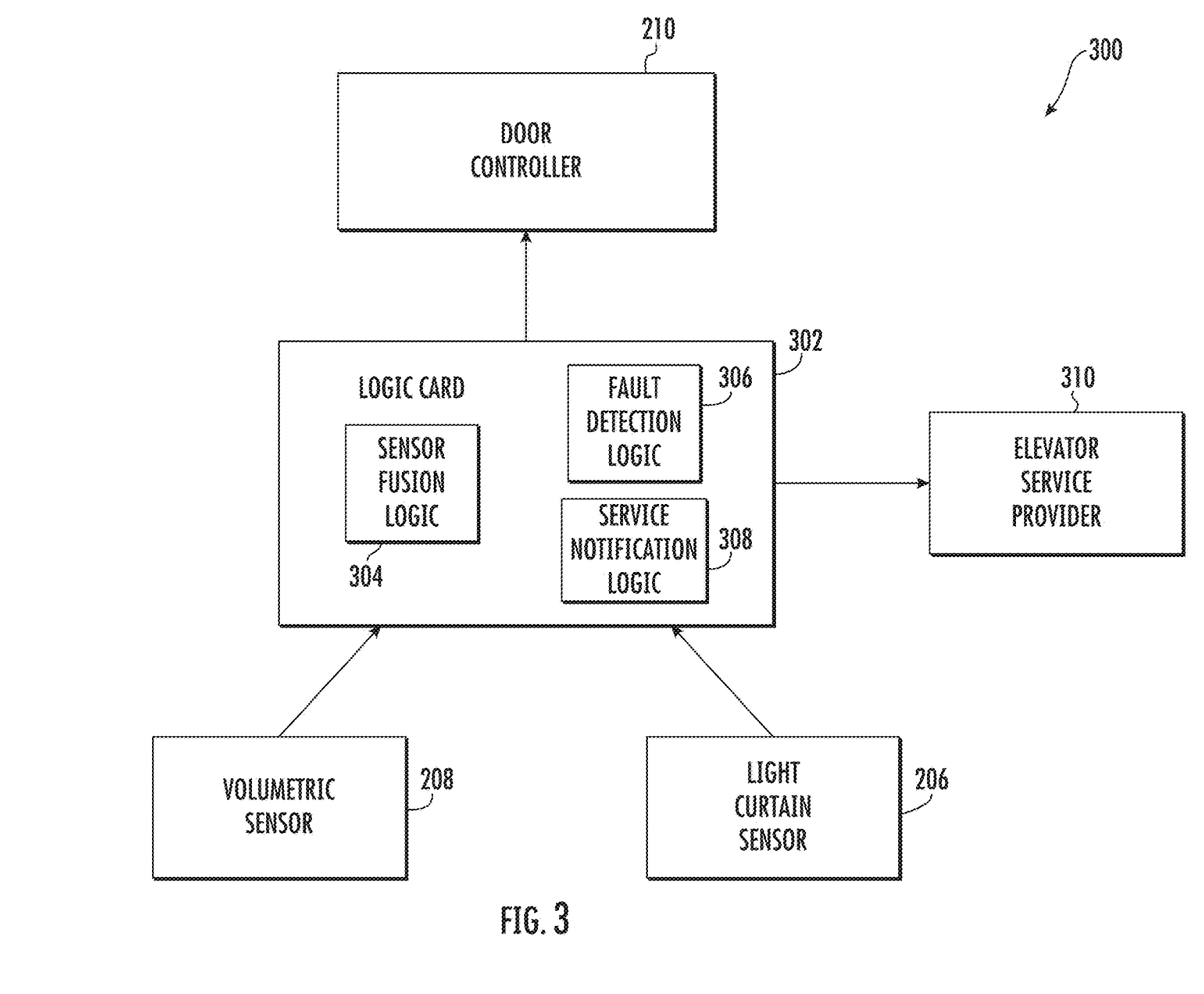
FIG. 3 is a schematic diagram of a system for elevator door sensor fusion, fault detection, and service notification in accordance with one or more embodiments of the present disclosure.

Turning now to FIG. 3, a schematic diagram of a system 300 for elevator door sensor fusion, fault detection, and service notification is generally shown in accordance with one or more embodiments of the present disclosure. The system 300 shown in FIG. 3 includes door controller 210, logic card 302, volumetric sensor 208, light curtain sensor 206, and an elevator service provider 310. The logic card 302 is shown in FIG. 3 as being a separate physical device from the door controller 210, however in one or more embodiments, the functions performed by the logic card 302 are integrated into the door controller 210.

As shown in FIG. 3, the logic card 302 includes sensor fusion logic 304, fault detection logic 306, and service notification logic 308. The sensor fusion logic 304 receives sensor output from the sensors that are monitoring passenger entry to and/or exit from an elevator car, such as elevator car 103 of FIG. 2. Two sensors, volumetric sensor 208 of FIG. 2 and light curtain sensor 206 of FIG. 2, are shown in FIG. 3. The logic card 302 is in communication with the sensors via any short-range wired or wireless communication method known in the art such as, but not limited to, Wi-Fi, Bluetooth, Zigbee, and infrared. In an embodiment, all of a subset of the processing performed by the sensor fusion logic 304, fault detection logic 306, and service notification logic 308 is performed remotely from the logic card 302 for example, in the cloud.

In one or more embodiments, the fault detection logic 306 compares expected patterns of sensor output to received, or actual, patterns of sensor output. The expected patterns can apply to expected output from a single sensor as well as an expected output sequence of multiple sensors. An example pattern is that volumetric sensor 208 may be expected to be triggered at least once every hour during the work week (or any other timeframe). If an output from the volumetric sensor 208 is not received every hour, then this may indicate that the volumetric sensor 208 is not working properly. Another example pattern is that if someone is assigned an elevator, for example by a destination entry terminal, then they are expected to be at the door of the elevator within a specified amount of time. If consistently no one is detected by the volumetric sensor 208 after the elevator is assigned, then this may indicate that the volumetric sensor is not working.

The expected sensor output patterns may be entered by a user, such as a system administrator, via a user interface. In addition or instead, the expected sensor output patterns may be generated and updated based on observed patterns of the sensor outputs. Alternatively, the expected sensor output patterns may be entered by a system administrator and then updated based on observed patterns. For example, a system administrator may input an expected elapsed time between two sensors being triggered. The actual amount of time, observed based on the sensor outputs, may be longer than the expected elapsed time and the system may update the expected elapsed time to be a longer amount of time.

In one or more embodiments, the fault detection logic 306 determines, or selects, an action to take based at least in part on detecting a sensor that is not following an expected pattern(s). The selecting can be based on a type of the sensor (e.g., code or non-code dependent) not following the expected pattern. The action may include changing an operating mode of the elevator to a nudging mode or removing the elevator car from service. This action can be communicated to the door controller 210 via a communication interface that may be implemented by any short or long-range wired or wireless communication method known in the art over networks such as, but not limited to the Internet, a local area network (LAN), and a wide area network (WAN). Examples of short-range wireless communication methods that can be utilized include, but are not limited to: Wi-Fi, Bluetooth, Zigbee, and infrared.

The action determined by the fault detection logic 306 may also include generating an alert to be sent to elevator service provider 310. The alert may be sent by the service notification logic 308 to the elevator service provider 310. The alert can be communicated to the elevator service provider 310 via a communication interface that may be implemented by any short or long-range wired or wireless communication method known in the art over networks such as, but not limited to the Internet, a local area network (LAN), a wide area network (WAN), and a cellular network.

Though not shown, the logic card 302 can include a hardware device, such as a processor for executing the sensor fusion logic 304, fault detection logic 306, and service notification logic 308, that can each include hardware instructions and/or software instructions. The processor may be a custom made or commercially available processor, a central processing unit (CPU), an auxiliary processor among several processors, a semiconductor based microprocessor (in the form of a microchip or chip set), a macroprocessor, or other device for executing instructions. In addition, the logic card 302 may include memory for storing the instructions and the expected patterns. The memory may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). The instructions in memory may include one or more separate programs, each of which comprises an ordered listing of executable instructions for implementing logical functions. In an embodiment, the instructions are executed in the cloud.

It should be appreciated that, although particular elements are separately defined in the schematic block diagram of FIG. 3, each or any of the elements may be otherwise combined or separated via hardware and/or software.

Figure 4:
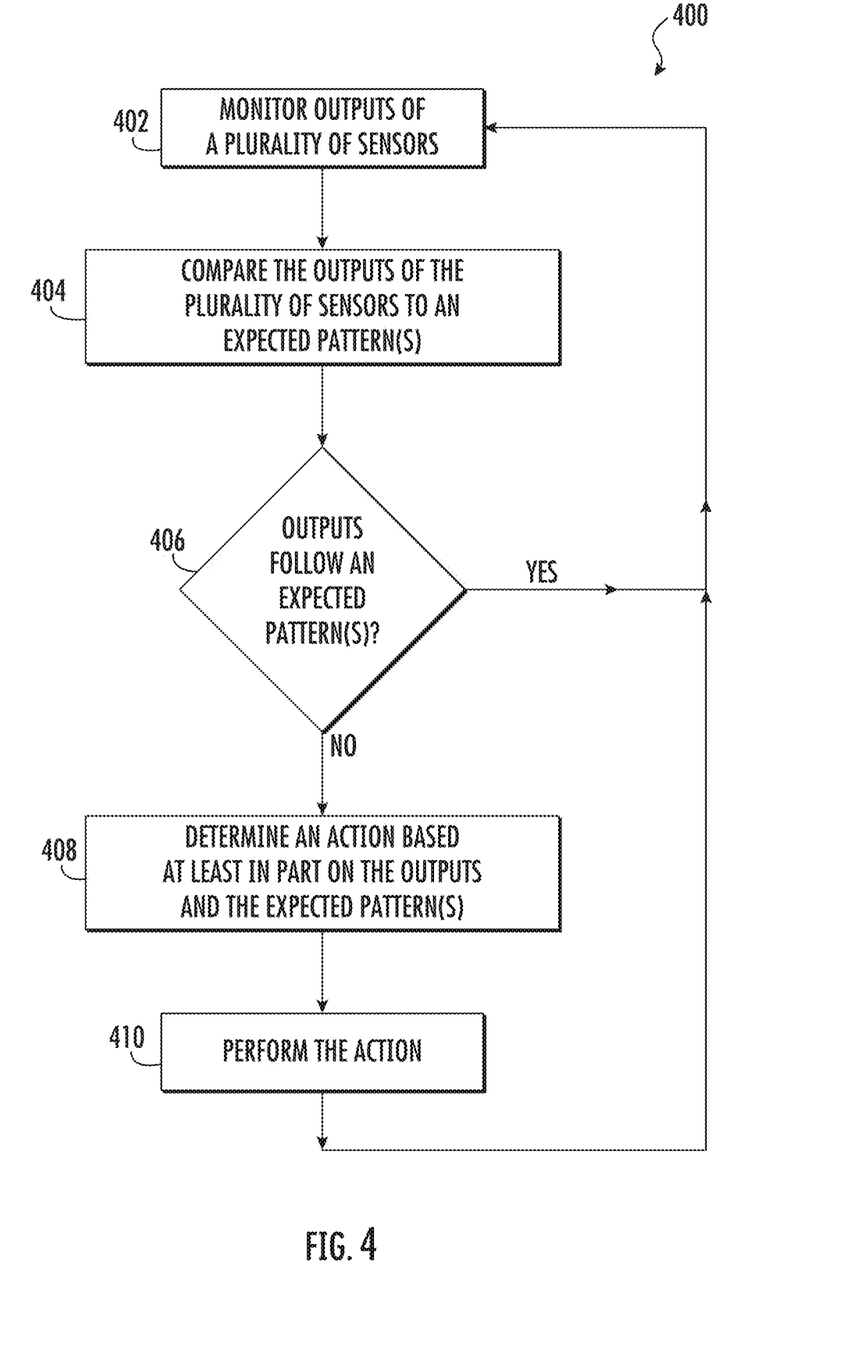
FIG. 4 is a flow diagram illustrating a method of elevator door sensor fusion, fault detection, and service notification in accordance with one or more embodiments of the present disclosure.

Turning now to FIG. 4, a flow diagram 400 illustrating a method of elevator door sensor fusion, fault detection, and service notification is generally shown in accordance with one or more embodiments of the present disclosure. In accordance with one or more embodiments, all or a subset of the processing shown in FIG. 4 is performed by logic card 302 of FIG. 3 and/or by computer instructions located in the cloud. At block 402, outputs of a plurality of sensors, such as volumetric sensor 208 of FIG. 2 and light curtain sensor 206 of FIG. 2, are monitored. In an embodiment, the monitoring is performed by sensor fusion logic 304 of FIG. 3, and the sensors are triggered to send an output to the monitor (e.g., sensor fusion logic 304) when they detect an object such as an approaching elevator passenger. In an embodiment the sensors are positioned to identify, or locate, objects such as passengers that are proximate to an elevator door, either inside or outside of an elevator car.

At block 404, the outputs of the sensors are compared to an expected pattern(s), and at block 406 it is determined whether the outputs of the sensors follow the expected pattern(s). The expected pattern(s) may specify a maximum elapsed time between an output from a first sensor and an output from a second sensor. For example, the first sensor may be a volumetric sensor located outside of an elevator car, such as volumetric sensor 208 of FIG. 1, and the second sensor may be a light curtain sensor across a door threshold, such as light curtain sensor 206 of FIG. 1. In this scenario, the volumetric sensor is expected to detect a passenger approaching the elevator door and the light curtain sensor is expected to detect when the passenger is in the door threshold. An expected pattern may specify that any time that an output is received from the light curtain sensor that there should have been an output received from the volumetric sensor within the previous two seconds (the maximum elapsed time in this example). If the monitored outputs do not follow this pattern (e.g., no output was received from the volumetric sensor in the previous two seconds prior to receiving output from the light curtain), then this may be an indication that the volumetric sensor is not operating properly.

An expected pattern may also specify an order of outputs from two or more sensors, for example that a first sensor is expected to be triggered prior to a second sensor. An expected pattern may further specify a relative amount of outputs expected from each sensor, for example that a first sensor is expected to be triggered twice as often as a second trigger. An expected pattern may further specify an expected or minimum frequency for a sensor to be triggered during a particular time period. The time period may be a number of hours or days or months. The time period may also specify other parameters such as time of day or a day or month, etc. For example a first sensor may be expected to be triggered at least once every hour during the morning hours on weekdays.

If it is determined, at block 406 of FIG. 4, that the outputs from the sensors are following an expected pattern(s), then processing continues at block 402 with monitoring the outputs from the sensors.

If it is determined, at block 406 of FIG. 4 that the outputs from the sensors are not following an expected pattern(s) indicating that a sensor may be faulty, then processing continues at block 408 with determining an action to take. The action can be selected based on the type of sensor that is not following the expected pattern. For example, if having the sensor operating properly is required for code compliance (the sensor is a code dependent sensor), then the action may include putting the elevator into a nudging mode and sending a high priority notification to an elevator service provider for repair or replacement of the sensor. In another example, if having the sensor operating properly is not required for code compliance (the sensor is a non-code dependent sensor), then the action may include sending a second level priority notification to an elevator service provider for repair or replacement of the sensor. At block 410, the action is initiated or performed and the processing continues at block 402.

While the above description has described the flow of FIG. 4 in a particular order, it should be appreciated that unless otherwise specifically required in the attached claims that the ordering of the steps may be varied.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

The term "about" is intended to include the degree of error associated with measurement of the particular quantity and/or manufacturing tolerances based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A system configured to detect sensor faults, the system comprising:
   a processor; and
   a memory comprising computer-executable instructions that, when executed by the processor, cause the processor to perform operations, the operations comprising:
   monitoring outputs of a plurality of sensors;
   determining whether the outputs of the plurality of sensors follow an expected pattern, the expected pattern including a minimum frequency of an output from the sensor; and
   based at least in part on determining that the outputs of the plurality of sensors do not follow the expected pattern:
   identifying a sensor in the plurality of sensors that is not following the expected pattern; and
   transmitting a notification indicating that the sensor is exhibiting unexpected behaviour.

2. The system of claim 1, wherein the expected pattern further includes a maximum elapsed time between an output from the sensor and an output from a second sensor in the plurality of sensors.

3. The system of claim 1, wherein the expected pattern further includes an output from a second sensor occurring after an output from the sensor.

4. The system of claim 1, wherein the plurality of sensors detect an object proximate to an elevator door of an elevator.

5. The system of claim 4, wherein the operations further comprise moving the elevator into a nudging mode based at least in part on determining that the outputs of the plurality of sensors do not follow the expected pattern.

6. The system of claim 4, wherein the operations further comprise removing the elevator from service based at least in part on determining that the outputs of the plurality of sensors do not follow the expected pattern.

7. The system of claim 1, wherein the sensor is a volumetric sensor.

8. The system of claim 1, wherein the sensor is a light curtain sensor.

9. The system of claim 1, wherein the operations further comprise updating the expected pattern based at least in part on the outputs of the plurality of sensors.

10. The system of claim 1, wherein the operations further comprise updating the expected pattern based at least in part on user input.

11. The system of claim 1, wherein the operations further comprise updating the expected pattern based at least in part on the outputs of the plurality of sensors and user input.

12. A method of detecting sensor faults, the method comprising:
    monitoring outputs of a plurality of sensors;
    determining whether the outputs of the plurality of sensors follow an expected pattern; and
    based at least in part on determining that the outputs of the plurality of sensors do not follow the expected pattern, the expected pattern including a maximum elapsed time between an output from the sensor and an output from a second sensor in the plurality of sensors:
    identifying a sensor in the plurality of sensors that is not following the expected pattern; and
    transmitting a notification indicating that the sensor is exhibiting unexpected behaviour.

13. The method of claim 12, wherein the expected pattern further includes a minimum frequency of an output from the sensor.

14. The method of claim 12, wherein the expected pattern further includes the output from the second sensor occurring after the output from the sensor.

15. The method of claim 12, wherein the plurality of sensors detect an object proximate to an elevator door of an elevator, and the method further comprises moving the elevator into a nudging mode based at least in part on determining that the outputs of the plurality of sensors do not follow the expected pattern.

16. The method of claim 12, wherein the plurality of sensors detect an object proximate to an elevator door of an elevator, and the method further comprises removing the elevator from service based at least in part on determining that the outputs of the plurality of sensors do not follow the expected pattern.

17. The method of claim 12, wherein the method further comprises updating the expected pattern based at least in part on the outputs of the plurality of sensors.

18. The method of claim 12, wherein the method further comprises updating the expected pattern based at least in part on user input.

* * * * *